(12) United States Patent
Zanoni

(10) Patent No.: US 7,946,839 B2
(45) Date of Patent: May 24, 2011

(54) APPARATUS AND METHOD FOR REMOVING OBJECTS FROM A FORMING DEVICE

(75) Inventor: Manuel Zanoni, Mordano (IT)

(73) Assignee: Sacmi Cooperativa Meccanici Imola Societa Cooperativa, Imolba (BO) (IT)

( * ) Notice: Subject to any disclaimer, the term of this patent is extended or adjusted under 35 U.S.C. 154(b) by 1255 days.

(21) Appl. No.: 10/554,915

(22) PCT Filed: Aug. 8, 2003

(86) PCT No.: PCT/EP03/08848
§ 371 (c)(1),
(2), (4) Date: Dec. 12, 2005

(87) PCT Pub. No.: WO2004/096515
PCT Pub. Date: Nov. 14, 2004

(65) Prior Publication Data
US 2006/0121149 A1 Jun. 8, 2006

(30) Foreign Application Priority Data
Apr. 30, 2003 (IT) .............................. MO2003A0122

(51) Int. Cl.
*B29C 43/08* (2006.01)
(52) U.S. Cl. ..................... 425/348 R; 425/350; 425/351; 425/413; 425/453; 425/809
(58) Field of Classification Search .................. 425/503, 425/453, 457, 809, 413, 414, 411, 451, DIG. 5, 425/DIG. 60, 233, 236, 344, 345, 347, 348 R, 425/350, 351, 361, 422; 264/320
See application file for complete search history.

(56) References Cited

U.S. PATENT DOCUMENTS

| 3,599,280 | A | * | 8/1971 | Rosenkranz et al. ............. 425/3 |
| 3,798,422 | A |   | 3/1974 | Foret et al. |
| 3,960,292 | A | * | 6/1976 | Knapp .......................... 221/211 |
| 4,035,463 | A | * | 7/1977 | Rosenkranz et al. ......... 264/521 |
| 5,088,915 | A | * | 2/1992 | Korsch et al. ................. 425/345 |
| 5,776,388 | A |   | 7/1998 | Andersen et al. |

(Continued)

FOREIGN PATENT DOCUMENTS

CH 294 509 11/1953

(Continued)

OTHER PUBLICATIONS

International Search Report for PCT/EP03/08848 dated Mar. 4, 2004.
Japanese Office Action for co-pending Japanese Application No. 2004-571239 and English translation, mailed Sep. 16, 2008, 5 pages.

*Primary Examiner* — Joseph S Del Sole
*Assistant Examiner* — Seyed Masoud Malekzadeh
(74) *Attorney, Agent, or Firm* — Nixon & Vanderhye P.C.

(57) ABSTRACT

An apparatus comprises a forming device for forming objects, a moving arrangement arranged for moving said objects along a path directed from said forming device towards an exit area, passage arrangement for an operating fluid, said passage arrangement being arranged for allowing said objects to be moved towards said exit area at least in a preset portion of said path. A method comprises forming objects, moving said objects along a path directed towards an exit area, and acting on said objects with an operating fluid at least in a preset portion of said path, so as to allow said objects to be moved towards said exit area.

18 Claims, 6 Drawing Sheets

U.S. PATENT DOCUMENTS

| | | | |
|---|---|---|---|
| 5,807,592 A * | 9/1998 | Alieri | 425/347 |
| 5,865,292 A | 2/1999 | White et al. | |
| 5,885,408 A * | 3/1999 | Kaminski | 156/567 |
| 6,343,496 B1 * | 2/2002 | Hanna et al. | 72/61 |
| 6,386,858 B1 | 5/2002 | Riddell | |
| 6,827,567 B2 * | 12/2004 | Kouda et al. | 425/78 |
| 6,837,696 B2 * | 1/2005 | Sowden et al. | 425/112 |
| 7,178,562 B2 * | 2/2007 | Ritz et al. | 141/2 |
| 7,182,199 B2 * | 2/2007 | Sowden et al. | 198/377.04 |

FOREIGN PATENT DOCUMENTS

| | | |
|---|---|---|
| EP | 218563 | 4/1987 |
| JP | 4-107111 | 4/1992 |
| JP | 6-254884 | 9/1994 |
| JP | 6271057 | 9/1994 |
| JP | 10-500370 | 1/1998 |
| JP | 10-202671 | 8/1998 |

\* cited by examiner

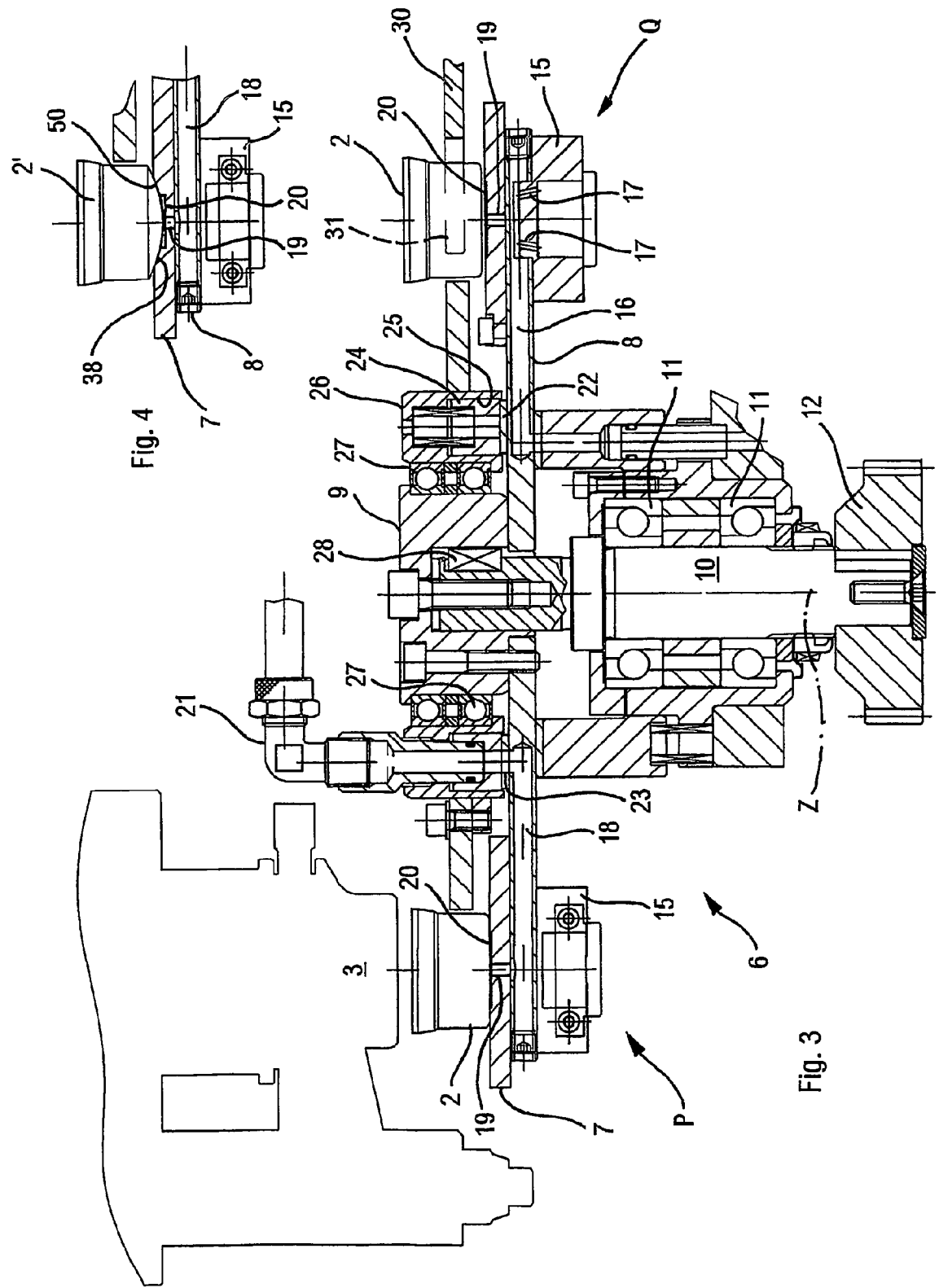

APPARATUS AND METHOD FOR REMOVING OBJECTS FROM A FORMING DEVICE

This application is the US national phase of international application PCT/EP2003/008848 filed 8 Aug. 2003, which designated the U.S. and claims priority to MO2003A000122 filed 30 Apr. 2003, the entire contents of each of which are hereby incorporated by reference.

The invention concerns an apparatus and a method for removing objects from a forming device, in particular for removing caps made of plastic material from a mould in which they have been formed by means of compression moulding.

U.S. Pat. No. 5,807,592 discloses an apparatus for producing caps provided with a plurality of moulds, each mould comprising a die in which a preset amount of plastic material in a fluid or semifluid state is fed, and further comprising a punch which interacts with the die so as to shape the plastic material in the fluid or semifluid state according to the desired shape of the cap.

When the moulds are opened, a cap remains associated to each punch, the cap being associated to the respective punch near a hollow portion of said cap arranged for engaging with the neck of a bottle.

The caps thus obtained are subsequently removed from the relative punches so as to fall, under the action of gravity, on an underlying circular plate of a transferring carousel.

Here a star-disc, provided with arms that radially protrude from the body of the disc, directs the caps towards an exit area through a path along which the caps are guided by respective side guides.

A drawback of the apparatus disclosed in U.S. Pat. No. 5,807,592 is that the caps falling on the circular plate of the transferring carousel can bounce and subsequently arrange themselves in an undesired position. The possibly bad-positioned caps may prevent the following caps from moving towards the exit area. When this happens, it is necessary to stop the apparatus and to manually remove the caps from the obstruction zone, which implies a loss of productivity.

Another drawback of the apparatus disclosed above is that said apparatus is suitable only for handling caps having a flat surface on a portion of said caps opposite to the hollow portion which engages the bottle neck. In fact the apparatus according to U.S. Pat. No. 5,807,592 is so configured that each cap faces the circular plate of the transferring carousel along the surface that is opposite to the above mentioned hollow portion. In order that the cap may rest on the circular plate thereby achieving a sufficient stable position, the surface that is opposite to the above mentioned hollow portion must have a flat geometry. If said surface is not flat, the cap may swing in relation to the circular plate and reach an undesired position. A further drawback of the apparatus according to U.S. Pat. No. 5,807,592 is due to its quite complicated structure from the constructional and operative point of view, since the above mentioned apparatus requires a relatively high number of mechanical parts, such as for example the star-disc and the guides, which have to be machined and mounted with great precision in order to work properly.

These parts are subjected to breakage or deformation, particularly if one or more non properly positioned caps prevent the following caps from moving towards the exit area, and in the transferring carousel piles of caps are created which exert anomalous stresses on the surrounding mechanical components.

Moreover, the star-disc and the guides constitute bulky parts that make difficult to manually remove the caps from the apparatus when the path towards the exit area is obstructed.

Another drawback of the apparatus described above is that it may handle only caps having an axial dimension above a lower limit. If the axial dimension of the caps is smaller than said lower limit, the star-disc acting on the side surface of the caps may collide with mechanical parts, for example guiding parts, protruding upwards from the circular plate or from the exit area.

U.S. Pat. No. 5,776,388 discloses an apparatus for forming articles from a starch-based composition. The apparatus comprises a plurality of interconnected heated moulds, each of which includes a male mould and a female mould. The formed articles are removed from female mould by a removing device comprising a rotating drum having a plurality of rotating arms. The rotating arms are attached to vacuum suction cups configured to remove formed articles from female mould and transfer them onto a conveyor belt.

U.S. Pat. No. 5,865,292 discloses an apparatus for blow moulding bottles, comprising a wheel carrying a plurality of moulds and a picker device for removing the bottles from the respective moulds. The picker device comprises a vacuum conveyor made up of a plenum and a moving plastic chain with attached buckets for receiving the bottles.

CH 294509 discloses an apparatus for manufacturing lipsticks, comprising a first wheel carrying a plurality of moulds in which the lipsticks are formed. A second wheel holds a plurality of supports by means of suction. After each lipstick has been formed, it is transferred onto a corresponding support. To this end, a couple of jaws reach a closed position above the first wheel, thereby defining a conduit for the lipstick. The latter, pushed by an air blast, is removed from the mould and conveyed onto the support.

JP 06-271057 discloses a rotary table having a plurality of work positions in a circumferential direction. A box to be printed is put in a work position of the rotary table by a box supply mechanism and is kept adherent to the rotary table by means of suction. The rotary table supplies the box to a pad type printer. After being printed, the box is removed from the rotary table.

U.S. Pat. No. 3,798,422 discloses a ticket reader which has a rotatable turret and a vacuum system for moving tickets between different stations, one or more of the stations being adapted to provide tickets, one of the stations including a reader for reading the tickets, and a plurality of the stations being adapted to receive the tickets after they have been read and interpreted.

EP 0218563 discloses an apparatus for transferring pieces of material, particularly lids, between two mutually movable handling devices. The apparatus comprises a lid collector provided with a suction-blow mechanism having three arms, which deposits the lid on a suction device on an intermittently rotating first conveyor. The lid is kept on the first conveyor by suction action and is successively moved to a position for leaving the lid to a projection plunge provided on the underside of a second conveyor and having a suction device for holding the lid.

An object of the invention is to improve the apparatuses and the methods for removing objects from a forming device in which said objects have been formed.

A further object of the invention is to reduce the risk of obstructing the path directed towards the exit area of a machine for forming objects.

A still further object is to obtain an apparatus and a method allowing objects having a complicated shape to be handled, for example caps having a non-flat surface on a portion of said caps opposite to the hollow portion which engages the bottle neck. Another object is to simplify the structure of the apparatuses for forming objects, thereby reducing the number of required mechanical parts and consequently improving construction, mounting, maintenance and operation of such apparatuses.

A further object of the invention is to obtain an apparatus which may process also objects having a very small axial dimension, and in particular low caps.

In a first aspect of the invention, an apparatus is provided according to independent claim 30.

In a second aspect of the invention, a method is provided comprising forming objects, moving said objects along a path according to independent claim 51.

The operating fluid, acting on the objects at least in a preset portion of the path directed towards the exit area, simplifies the movement of the objects along said path.

In particular, the operating fluid allows bounces of the objects coming from the forming device to be avoided, thus preventing the objects from reaching an undesired position on the moving arrangement and causing dangerous obstructions. Thus, it is possible to obtain a method and an apparatus having high productivity.

The operating fluid further enables objects having a complicated shape to be processed, for example a non-flat shape.

Finally, owing to the operating fluid it is possible to avoid complex mechanical moving devices, such as the star-disc or the guides disclosed in U.S. Pat. No. 5,807,592. This improves production, operating and maintenance of the apparatus according the invention.

The invention will be better disclosed and carried out with reference to the accompanying drawings, that show some exemplifying and not limiting embodiments thereof, in which:

FIG. 3 is an enlarged and interrupted cross-section taken along the plane III-III of FIG. 2;

FIG. 4 is a detail of a cross-section as the one in FIG. 3, concerning the production of an alternative version of caps;

Figure 1:
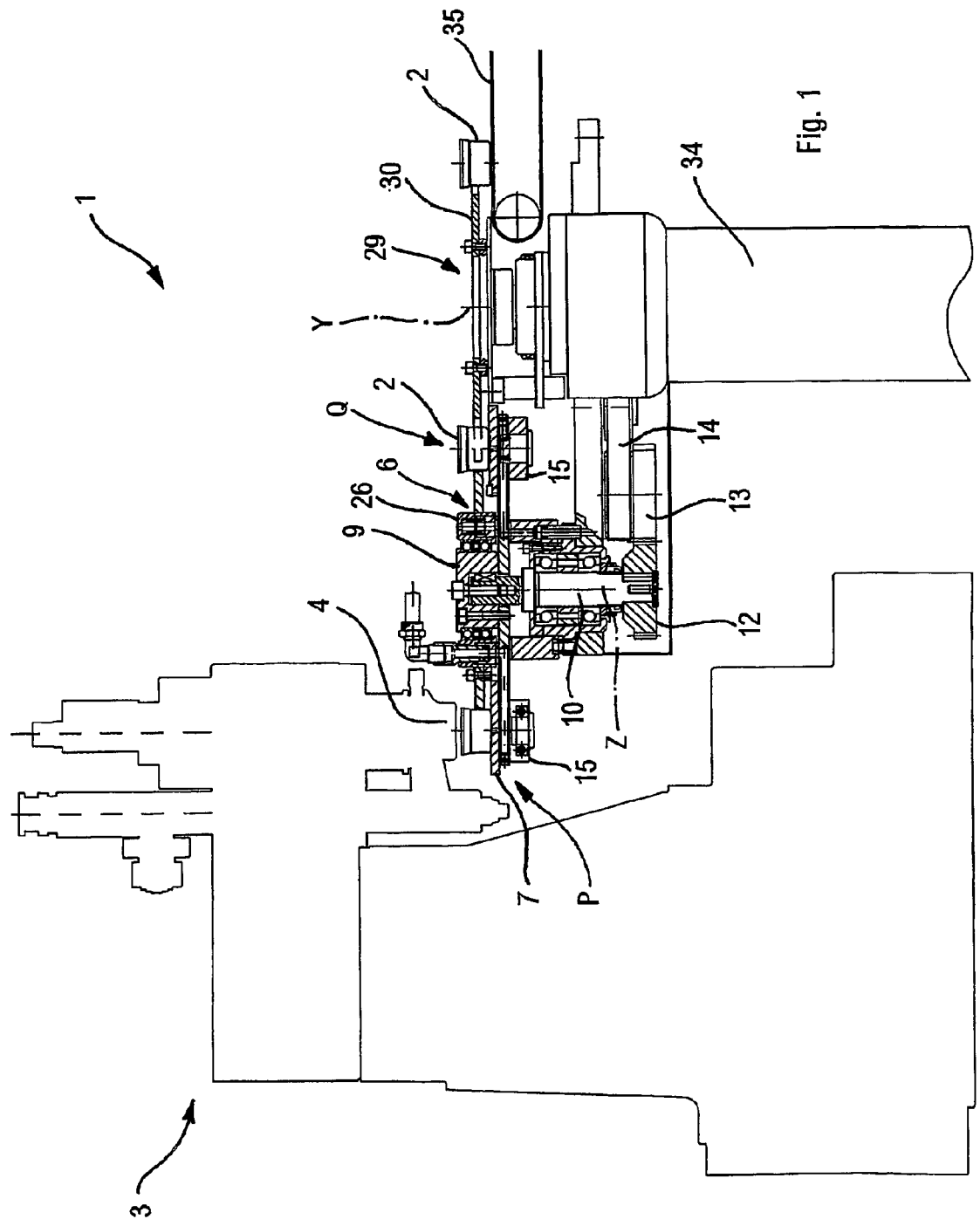
FIG. 1 is a schematic and interrupted front view of an apparatus for producing caps according to the invention.
Figure 2:
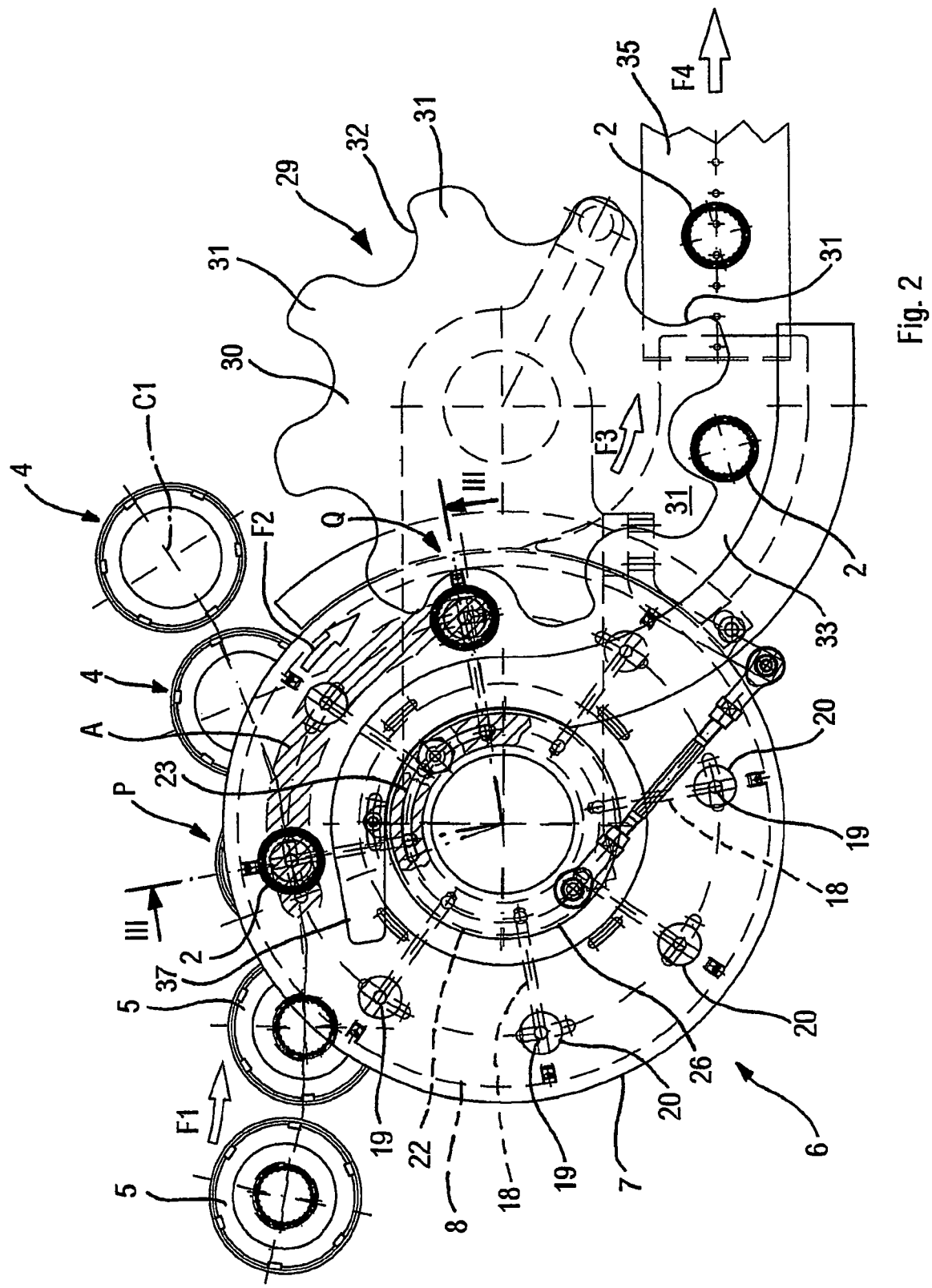
FIG. 2 is a top view of a moving arrangement of the apparatus shown in FIG. 1.

With reference to FIGS. 1 and 2, an apparatus 1 is shown for producing objects made of plastic material, for example caps 2 for bottles, by means of compression moulding. The apparatus 1 comprises a forming device 3 provided with a plurality of moulds 4 that may rotate about a vertical axis along a circumference C1, as indicated by the arrow F1 of FIG. 2. Each mould 4 comprises a die 5 provided with a cavity that is shaped according to the external geometry of the cap 2 to be obtained, and a punch arranged above the die 5 and reproducing the internal geometry of the cap 2.

Along the path of each mould 4 along the circumference C1, it is possible to identify a mould feeding step in which a preset amount of plastic material in a fluid or semifluid state is fed in each die 5, a forming and stabilizing step for forming and stabilizing the cap 2 in the mould 4, and an unloading step in which the just formed cap 2 is extracted from the mould 4.

During the forming and stabilizing step, the die 5 and the punch are arranged in a closed configuration in which they mutually cooperate for shaping the plastic material according to the desired geometry of the cap 2. On the contrary, in the mould feeding step and in the unloading step the die 5 and the punch are arranged in an open configuration, in which they are at a certain mutual distance so as to allow the plastic material to be introduced into the mould 4 and the just formed cap 2 to be removed from the mould 4.

In particular, the mould feeding step and the unloading step occur substantially simultaneously because, while the just formed cap 2 is removed from the punch, a dose of plastic material in a fluid or semifluid state is fed into the underlying die 5. This takes place when the mould is in the first position P indicated in FIGS. 1 and 2.

At the end of the forming step, the cap 2 is removed from the punch, for example by exerting an extraction pressure, and delivered to a moving arrangement arranged for moving each cap 2 towards an exit area of the apparatus 1.

The moving arrangement comprises a transferring wheel 6 which may rotate about a first vertical axis Z, and on which each cap 2 falls from the above punch, under the effect of gravity.

As shown in detail in FIG. 3, the transferring wheel 6 comprises a ring 7 suitable for receiving the end surface of the caps 2 that is opposite to the hollow portion of said caps in which the bottle neck has to be inserted. The ring 7 is fixed to a circular plate 8 that is in turn connected, by means of a lid 9, to the end of a shaft 10 extending along the first axis Z. The shaft 10 is rotatably supported by bearings 11 and it is rotated by means of a gear 12, which is in turn operated by means of a further gear 13 that is rotated by means of a belt 14, as shown in FIG. 1.

At the lower surface of the circular plate 8 a plurality of cups 15 is fixed. Each cup 15 can comprise, for example, a member having a U-shaped section taken along a plane orthogonal to the first axis Z. The cup 15 can have any other different shape that is suitable for receiving the plastic material which will form the caps 2.

The cups 15 rotate together with the circular plate 8 and define a circular path along which they interact with an extruder, not shown, provided with an upwards directed mouth from which plastic material in a fluid or semifluid state exits. When a cup 15 passes above the extruder, it takes away from the latter a prefixed amount of plastic material which, due to its pasty consistency, adheres to the walls of the cup 15. When the cup 15, during its movement along the circular path around the first axis Z, reaches the first position P above an empty die 5, a compressed air blast detaches the plastic material from the above mentioned cup and causes the plastic material to fall in the underlying die 5. The compressed air is sent to each cup by means of a passage 16 obtained in the circular plate 8 and communicating with the external environment by means of a plurality of further passages 17 obtained in an upper portion of the cup 15.

A first suction device is associated to the transferring wheel 6, said first suction device comprising a plurality of radial conduits 18 obtained in the thickness of the circular plate 8, and communicating with the external environment by means of respective through holes 19 vertically extending through the circular plate 8 and the ring 7. On the upper surface of the ring 7, at each through hole 19, a spot-facing 20 can be provided, said spot-facing being arranged for receiving the end surface of a cap 2 that is opposite to the hollow portion of the same cap.

The radial conduits 18 may be selectively connected to a vacuum pump, not shown, by means of a distributor 22, that is shown in FIGS. 2 and 3. The distributor 22 has an annular shape and is provided with a slot 23 extending along the distributor 22 for an angular extension that is slightly greater than 90°. The distributor 22 is fixed to the lower surface of an annular element 24 housed in a groove 25 obtained in a further annular element 26. The latter is arranged in a fixed position on the apparatus 1 and supports the external rings of two further bearings 27, on which the lid 9 is mounted. Thus the lid 9, fixed to the shaft 10 by means of a spline 28, may rotate in relation to the annular element 24, to the further annular element 26 and to the distributor 22, thereby dragging in rotation the circular plate 8 and the ring 7.

A pneumatic connector 21, connected to the annular element 24 and to the further annular element 26, enables the distributor 22 to be connected to the vacuum pump.

When the circular plate 8 and the ring 7, which is fixed to said circular plate, rotate about the first axis Z in the direction of the arrow F2 shown in FIG. 2, the distributor 22 connects the radial conduits 18 to the vacuum pump along a suction section A, which is hatched in FIG. 2 and has an angular length slightly greater than 90°. In particular, each radial conduit 18 is connected to the vacuum pump just before the relative spot-facing 20 reaches the first position P, and it is isolated from this pump near a second position Q in which the transferring wheel 6 interacts with an evacuation wheel 29 arranged for transporting the caps 2 towards an exit area of the apparatus 1.

When, in the first position P, a cap 2 which has been removed from the relative punch falls under gravity onto the transferring wheel 6, said cap is kept adherent to the ring 7 near the respective spot-facing 20, owing to the suction acting along the section A.

The cap 2, firmly associated to the ring 7 by means of suction, is moved together with the transferring wheel 6 for an angular distance of about 90°, until said cap reaches the second position Q in which it is collected by the evacuation wheel 29.

The latter may rotate about a second axis Y, parallel to the first axis Z and therefore vertical, in a rotation direction opposite to the rotation direction of the transferring wheel 6, as indicated by the arrow F3 of FIG. 2. The evacuation wheel 29 is arranged at the upper end of a vertical support 34 fixed to a frame of the apparatus 1. A non-shown shaft extends inside the vertical support 34, said shaft enabling the evacuation wheel 29 to rotate owing to a known driving device. The driving device that actuates the evacuation wheel 29 may also move the belt 14, by means of which movement is transmitted to the transferring wheel 6.

The evacuation wheel 29 comprises a star-disc 30 provided with a plurality of radial arms 31, each radial arm being provided with a front edge 32 arranged for interacting with a cap 2 in order to remove said cap from the transferring wheel 6 and direct said cap along an arc-shaped transfer plane 33.

The evacuation wheel 29 interacts with the transferring wheel 6 near the second position Q, in which the suction section A on the transferring wheel 6 ends. In such position, the cap 2 is merely resting on the ring 7, no additional force maintaining the cap 2 in contact with the above mentioned ring. The corresponding radial arm 31 of the star-disc 30 may therefore easily remove the cap 2 from the transferring wheel 6 by means of mechanical action and direct said cap along the arc-shaped transfer plane 33 until the cap 2 reaches a belt conveyor 35 that conveys each cap 2 towards the exit of the apparatus 1 in the direction of the arrow F4.

In the embodiment of FIG. 2, the star-disc 30 is provided with eight radial arms 31, corresponding to the eight spot-facings 20 and to the eight radial conduits 18 of the transfer wheel 6. Nevertheless, according to the machine type and to the desired speed, it is possible to provide a different number of radial arms 31, of spot-facings 20 and of radial conduits 18. The apparatus 1 further comprises a S-shaped guide 37 arranged for guiding the caps 2 in their path towards the belt conveyor 35. The guide 37 is fixed to a central zone of the transferring wheel 6 and it is provided with an end extending along the arc-shaped transfer plane 33.

The first suction device, associated with the upper surface of the transferring wheel 6, enables the caps 2 to be kept adherent to the ring 7 during their path towards the evacuation wheel 29. In particular, when each cap 2 is removed from the corresponding punch, the first suction device exerts on such cap an attractive force directed towards the transferring wheel 6, said attractive force making easier removing the cap 2 from the punch.

Furthermore, owing to the first suction device it is possible to prevent the caps 2 from bouncing on the transferring wheel 6 when falling from the upper punch. Thus, the risk of jams in the apparatus 1 due to an incorrect positioning of the caps 2 which bounce on the transferring wheel 6 is strongly reduced.

The first suction device also assures that the caps 2 remain in the correct position on the transferring wheel 6 during their path towards the evacuation wheel 29.

It is to be noted that the transferring wheel 6 and the evacuation wheel 29 can handle caps 2 having mutually different dimensions and/or shapes without requiring size parts to be replaced. In fact, suction occurring over the spot-facings 20 enables caps 2 having different sizes to be kept adherent to the transferring wheel 6. This allows the re-equipment time of the apparatus 1 to be reduced, said re-equipment time being necessary for enabling such apparatus to pass from production of caps 2 of a specific dimensional range to production of caps 2 of a further dimensional range.

As shown in detail, in FIG. 4, the apparatus according to the invention is suitable for handling objects, for example caps, having a quite complex shape. In the case in point, it is shown a cap 2' having a convex surface 138 delimiting the cap 2' in its end portion that is opposite to the hollow portion suitable for engaging with the bottle neck.

The cap 2' can be easily kept adherent to the transferring wheel 6 by means of the first suction device, by merely providing the ring 7 with a plurality of seats 50 having a shape corresponding to the geometry of the cap 2'. The seats 50 communicate with the radial conduits 18 through the holes 19 and can be provided with respective spot-facings 20.

When the cap 2' is removed from the punch, said cap falls onto a seat 50 and shapingly engages with said seat. Owing to suction exerted through the radial conduits 18, the cap 2' is prevented from leaving the seat 50.

Figure 5:
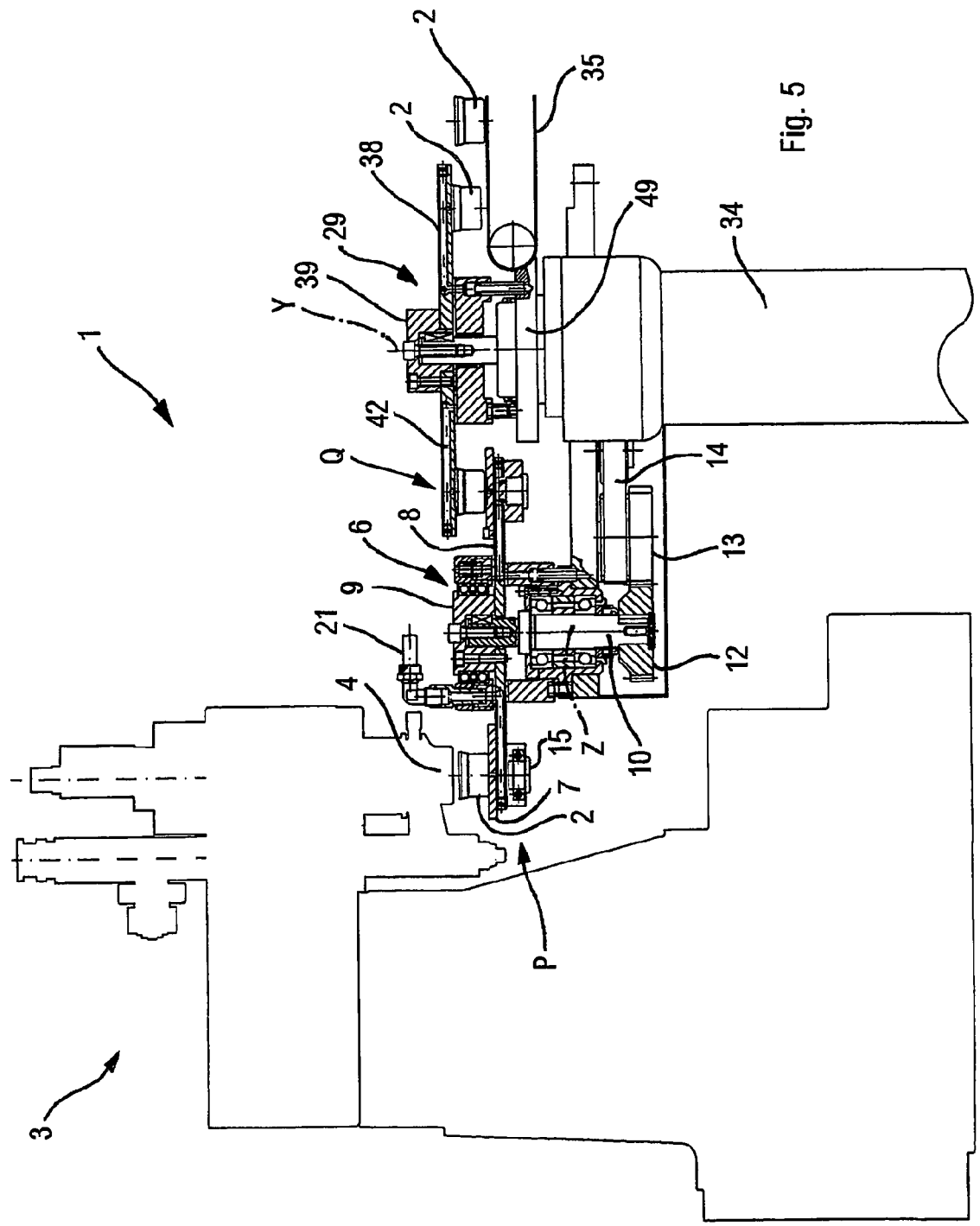
FIG. 5 is a view as the one in FIG. 1, showing an alternative version of the apparatus according to the invention.
Figure 6:
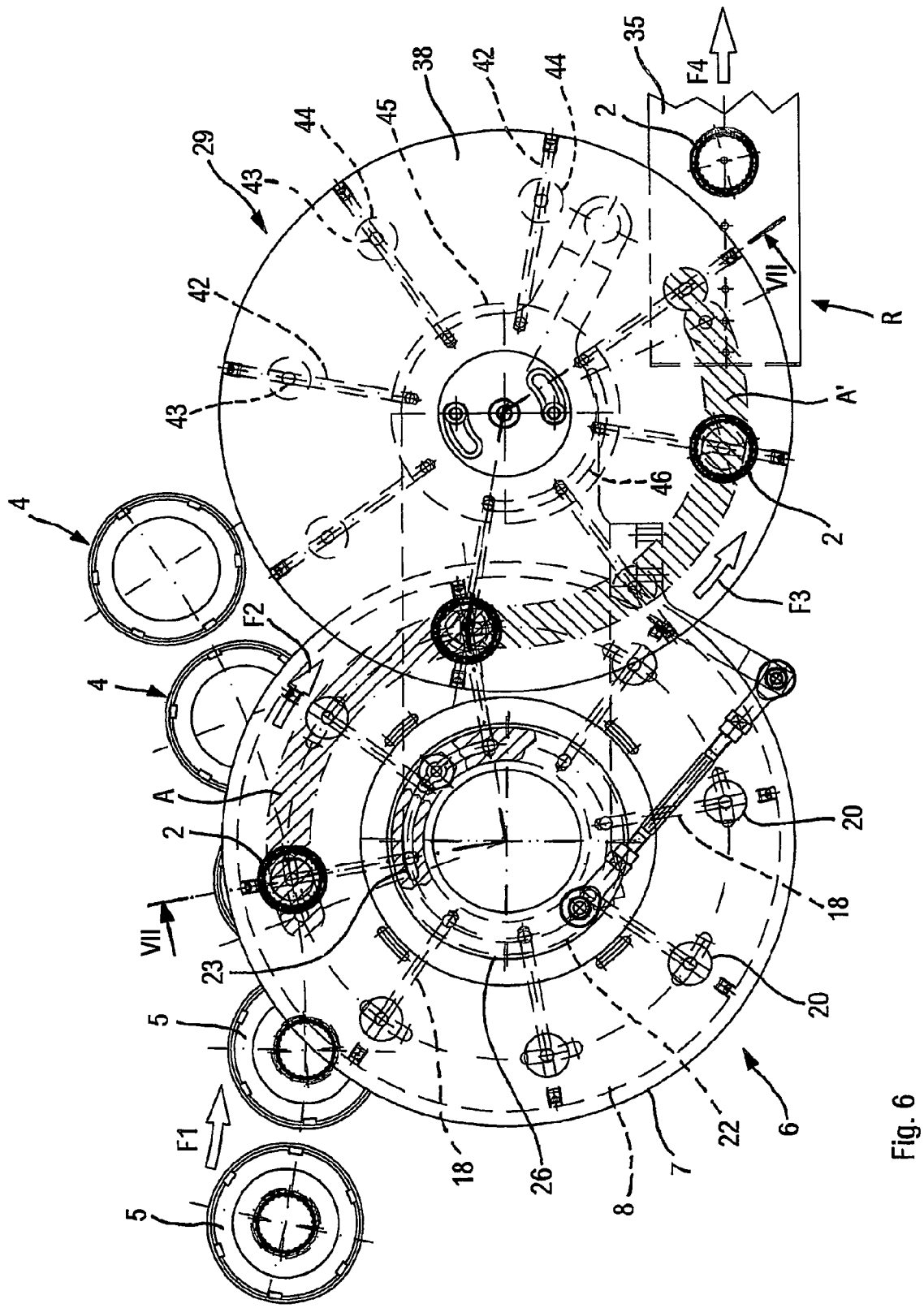
FIG. 6 is an enlarged and interrupted top view of the apparatus of FIG. 5, showing a moving arrangement.
Figure 7:
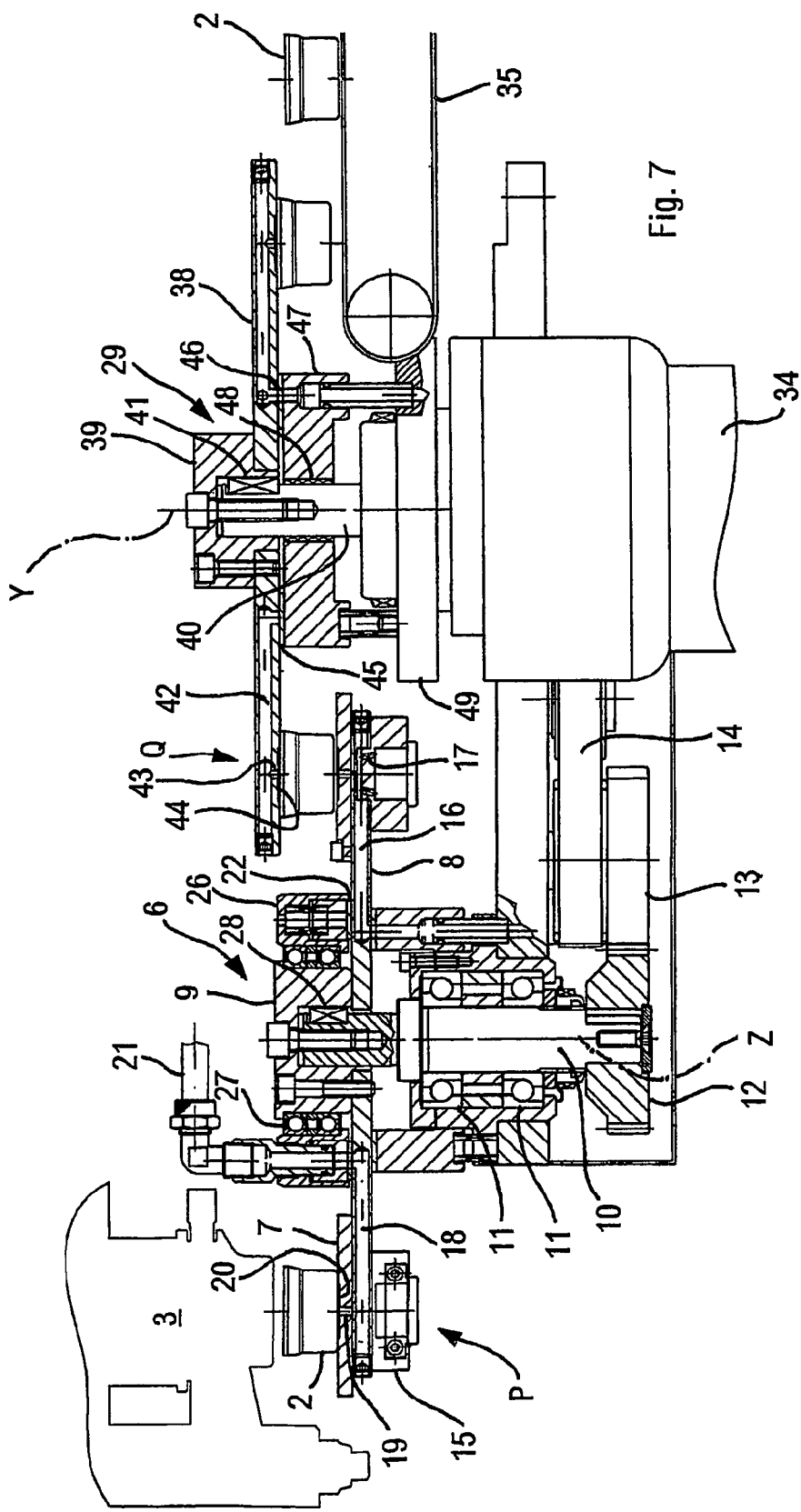
FIG. 7 is an enlarged and interrupted cross-section along the plane VII-VII of FIG. 6.

With reference to FIGS. 5 to 7, an alternative embodiment of the apparatus 1 is shown, said alternative embodiment differing from the embodiment of FIGS. 1 to 3 for the structure of the evacuation wheel 29. The forming device 3 and the transferring wheel 6 have a structure similar to that previously described.

The evacuation wheel 29 according to FIGS. 5 to 7 comprises a disc 38 fixed to a further lid 39 coupled to a further shaft 40 by means of a further spline 41. The further shaft 40 extends along the second axis Y inside the vertical support 34 and it is operated by a known driving device.

A second suction device is associated with the evacuation wheel 29, said second suction device comprising a plurality of further radial conduits 42 obtained in the thickness of the disc 38 and ending at further through holes 43 arranged in exit areas on the lower surface of the disc 38. Around each further through hole 43 a further spot-facing 44 can be provided, said further spot-facing 44 being obtained on the lower surface of the disc 38.

The further radial conduits 42 can be connected to a suction source through a further distributor 45 comprising a body having an annular shape that is positioned under the disc 38. The further distributor 45 is provided with a further through slot 46 extending along an angle of about 120° and is fixed to a support member 47 mounted around the further shaft 40, with interposition of a bushing 48. The support member 47 is further connected to a plate 49 fixed to the vertical support 34. Therefore, when the disc 38 rotates the further distributor 45 remains in a fixed position on the apparatus 1.

Each exit area arranged around the further through hole 43 of the disc 38 communicates with the suction source along a portion of the path around the second axis Y that corresponds to a further suction section A', hatched in FIG. 6. More in particular, by means of the further distributor 45 each exit area is connected to the suction source when the evacuation wheel 29 interacts with the transferring wheel 6 in the second position Q, and is isolated from the suction source in a third position R in which the exit area is over the belt conveyor 35. In operation, in the second position Q each cap 2, initially arranged on the transferring wheel 6, is collected by the evacuation wheel 29 by means of suction exerted through the further through holes 43. The cap 2, which is no more retained on the transferring wheel 6 by suction because suction ends near the second position Q, adheres to the lower surface of the disc 38 at the end surface of the cap arranged for engaging with the bottle neck and is moved togetherwith such disc until it reaches the third position R. In this position, suction through the further conduits 42 ends and the cap 2 stops adhering to the disc 38, thereby falling by gravity on the underlying belt conveyor 35.

The disc 38 provided with a second suction device may replace the star-disc 30, which allows the structure of the evacuation wheel 29 to be significantly simplified. In fact, it is no more necessary to provide a plurality of radial arms having large overall dimensions and causing a complicated access to the evacuation wheel 29. Furthermore, pneumatically transporting the caps 2 enables the risks of damaging the caps 2 during transport to be reduced. On the other hand, such risks are quite high in case of transport by means of mechanical elements pushing the caps 2 along the desired path.

Owing to the second suction device, the evacuation wheel 29 further allows caps 2 having different dimensions and/or shape to be transported, without replacing size parts.

Furthermore the evacuation wheel 29 is suitable for processing caps 2 having also irregular shapes, in particular caps delimited by a non-flat surface on the portion of said caps opposite to the hollow portion arranged for engaging with the bottle neck.

Owing to the second suction device the apparatus 1 may furthermore handle very low caps, i.e. caps having a particularly small axial dimension that cannot be processed by the known star-discs. In fact, the evacuating wheel 29 associated with the second suction device is not provided with mechanical parts which, while acting on the side surface of the caps 2, could bump against other parts of the apparatus. The second suction device allows the evacuating wheel 29 to act only on the hollow portion of the caps 2, thereby preventing any collision against adjacent parts.

It is to be noted that the evacuation wheel 29 provided with the second suction device can be used also in combination with a transferring wheel 6 of the known type, i.e. without the first suction device.

The apparatus 1 disclosed above can be used not only for processing caps 2, but also for processing other kinds of objects, for example cups, items provided with an axial symmetry, or in general articles that can be obtained by moulding.

The invention claimed is:

1. Apparatus comprising:
   a forming device for compression moulding of caps made of plastic material, said forming device being provided with a plurality of moulds that rotate about a vertical axis along a circumference, each mould comprising a die provided with a cavity that is shaped according to the external geometry of a cap, and a punch arranged above the die and adapted to reproduce the internal geometry of said cap;
   a transferring wheel arranged for receiving said caps from said forming device, said transferring wheel being located below said punches, each cap being removed from a punch and delivered to the transferring wheel, wherein each cap being adapted to fall from the respected punch on the transferring wheel, said transferring wheel being configured to receive an end surface of each cap that is opposite to a hollow portion of the cap in which a bottle neck has to be inserted;
   an evacuation wheel arranged for transferring said caps from said transferring wheel to an exit zone;
   a first suction device arranged for keeping said caps associated with said transferring wheel along a suction section comprised between a collecting position of said caps from said forming device and a delivering position of said caps to said evacuation wheel, said first suction device comprising a first passage through which an operating fluid is conveyable, said first passage passing through a plate portion of said transferring wheel and leading out on a surface of said plate portion for keeping said caps adherent to said plate portion at least along said suction section, wherein said surface comprises an upper surface of said transferring wheel,
   a second suction device arranged for keeping said caps associated with said evacuation wheel along a further suction section comprised between said delivering position and said exit zone, said second suction device comprising a second passage through which an operating fluid is conveyable, said second passage passing through a further plate portion of said evacuation wheel and leading out on a further surface of said further plate portion for keeping said caps adherent to said further plate portion at least along said further suction section, said further surface being opposite to said surface at least in said delivering position, said further surface comprising a lower surface of said evacuation wheel to which the cap adheres at a further end surface of the cap opposite said end surface, at least one of said first and second passages ending on at least one wheel of said transferring and evacuation wheels near a seat for said caps.

2. Apparatus according to claim 1, wherein said first suction device comprises a distributor element arranged for selectively connecting said first passage with a suction source.

3. Apparatus according to claim 2, wherein said first passage is obtained in a disc of said transferring wheel, said disc being rotatably movable in relation to said distributor element around a preset axis.

4. Apparatus according to claim 3, wherein said distributor element is provided with a slot communicating with said suction source.

5. Apparatus according to claim 4, wherein said slot extends along a circular section arranged around said preset axis.

6. Apparatus according to claim 5, wherein said first passage is provided with an end facing said distributor element at a distance from said preset axis that is substantially equal to a radius of said circular section.

7. Apparatus according to claim 3, wherein said first passage comprises at least one conduit radially extending through said disc.

8. Apparatus according to claim 7, wherein said at least one conduit is included in a plurality of conduits which are angularly equidistant on said disc.

9. Apparatus according to claim 1, wherein said second suction device comprises a further distributor element arranged for selectively connecting said second passage with a suction source.

10. Apparatus according to claim 9, wherein said second passage is obtained in a further disc of said evacuation wheel, said further disc being rotatably movable in relation to said further distributor element around a preset axis.

11. Apparatus according to claim 10, wherein said further distributor element is provided with a further slot communicating with said suction source.

12. Apparatus according to claim 11, wherein said further slot extends along a circular section arranged around said preset axis.

13. Apparatus according to claim 12, wherein said second passage is provided with an end facing said further distributor element at a distance from said preset axis that is substantially equal to a radius of said circular section.

14. Apparatus according to claim 9, wherein said second passage comprises at least one further conduit radially extending through said further disc.

15. Apparatus according to claim 14, wherein said at least one further conduit is included in a plurality of further conduits which are angularly equidistant on said further disc.

16. Apparatus according to claim 1, wherein said evacuation wheel comprises a star-disc provided with a plurality of radial arms arranged for pushing said caps from said transferring wheel to said exit zone.

17. Apparatus according to claim 1, wherein in said exit zone a conveyor device is provided, said conveyor device being arranged for removing said caps from said evacuation wheel.

18. Apparatus according to claim 1, and further comprising at least one spot-facing at which at least one passage of said first and second passages ends on an external surface of at least one wheel of said transferring and evacuation wheels.

\* \* \* \* \*